United States Patent
Pandey et al.

(10) Patent No.: US 10,726,187 B2
(45) Date of Patent: Jul. 28, 2020

(54) SELF-ALIGNED DOUBLE PATTERNING-AWARE ROUTING IN CHIP MANUFACTURING

(71) Applicant: International Business Machines Corporation, Armonk, NY (US)

(72) Inventors: Diwesh Pandey, Bangalore (IN); Gustavo E. Tellez, Essex Junction, VT (US); Shaodi Gao, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 36 days.

(21) Appl. No.: 16/143,697

(22) Filed: Sep. 27, 2018

(65) Prior Publication Data
US 2020/0104449 A1    Apr. 2, 2020

(51) Int. Cl.
*G06F 30/00* (2020.01)
*G06F 30/394* (2020.01)
*G06F 30/398* (2020.01)
*G06F 119/18* (2020.01)

(52) U.S. Cl.
CPC .......... *G06F 30/394* (2020.01); *G06F 30/398* (2020.01); *G06F 2119/18* (2020.01)

(58) Field of Classification Search
CPC ............. G06F 17/5077; G06F 17/5081; G06F 2217/12; G06F 30/394; G06F 30/398; G06F 2219/18
See application file for complete search history.

(56) References Cited

U.S. PATENT DOCUMENTS

| | | | |
|---|---|---|---|
| 8,312,394 B2* | 11/2012 | Ban | G06F 17/5068 716/50 |
| 8,402,396 B2* | 3/2013 | Kahng | G03F 1/70 716/110 |
| 8,782,586 B2 | 7/2014 | Sezginer et al. | |

(Continued)

OTHER PUBLICATIONS

Anonymous, "Methodology to improve SADP metal routability for lower technology nodes", IPCOM000252144D, Dec. 18, 2017, pp. 1-5.

(Continued)

*Primary Examiner* — Naum Levin
(74) *Attorney, Agent, or Firm* — Cantor Colburn LLP; Erik Johnson

(57) ABSTRACT

A method of generating a routing result to manufacture an integrated circuit using self-aligned double patterning includes generating an initial routing result that indicates a location and length of connections between components, and generating an initial constraint graph with trim shapes indicating gaps in the connections being represented as nodes and with arcs indicating relative position constraints between a pair of the nodes. The method also includes subdividing the initial constraint graph into two or more subgraphs, determining a final position of each of the nodes in the two or more subgraphs, and generating a routed design with the trim shapes having the final position of corresponding ones of the nodes relative to the connections and with extents filling in spaces between one or more of the trim shapes and associated connections. The routed design is provided for manufacture of the integrated circuit.

17 Claims, 8 Drawing Sheets

(56) References Cited

U.S. PATENT DOCUMENTS

| | | | | |
|---|---|---|---|---|
| 8,826,193 | B1* | 9/2014 | Du | G03F 1/70 716/51 |
| 8,863,048 | B1* | 10/2014 | Gerousis | G06F 17/5072 716/100 |
| 9,158,879 | B2* | 10/2015 | Yuan | G06F 17/5077 |
| 9,286,432 | B1 | 3/2016 | Gerousis et al. | |
| 9,330,221 | B2* | 5/2016 | Yuan | G06F 17/5077 |
| 9,384,319 | B2* | 7/2016 | Cilingir | G03F 1/36 |
| 9,425,049 | B2* | 8/2016 | Huang | H01L 21/0338 |
| 9,477,804 | B2* | 10/2016 | Su | G06K 9/76 |
| 9,613,177 | B2 | 4/2017 | Yuan et al. | |
| 9,652,579 | B1* | 5/2017 | Arkhipov | G06F 17/5081 |
| 9,735,029 | B1* | 8/2017 | Chu | H01L 27/0207 |
| 9,904,756 | B1* | 2/2018 | Ruehl | G06F 17/5081 |
| 10,192,018 | B1* | 1/2019 | Gerousis | G06F 17/5081 |
| 10,192,021 | B1* | 1/2019 | Raj | G06F 17/5072 |
| 10,296,703 | B1* | 5/2019 | Juneja | G06F 17/5081 |
| 10,311,195 | B2* | 6/2019 | Xue | G06F 17/5081 |
| 2010/0023914 | A1* | 1/2010 | Sahouria | G03F 1/70 716/50 |
| 2016/0320706 | A1* | 11/2016 | Hsu | H05K 3/0082 |
| 2017/0110405 | A1* | 4/2017 | Peng | H01L 23/5286 |
| 2017/0300608 | A1 | 10/2017 | Narisetty et al. | |
| 2018/0024443 | A1 | 1/2018 | Wittebrood | |
| 2018/0082854 | A1 | 3/2018 | Chu et al. | |
| 2019/0138681 | A1* | 5/2019 | Topaloglu | G03F 1/36 |
| 2019/0179994 | A1* | 6/2019 | Darden | G06F 17/5072 |

OTHER PUBLICATIONS

Anonymous, "MXCUT or TRIM Grid Award Pin Connections to Minimize the SADP Layter Route Length", IPCOM000251662D, Nov. 21, 2017, pp. 1-6.

Ding et al., "Self-Aligned Double Patterning Lithography Aware Detailed Routing With Color Preassignment", IEEE Transactions on Computer-Aided Design of Integrated Circuits and Systems, vol. 36, No. 8, Aug. 2017, pp. 1381-1394.

Ding et al., "Self-Aligned Double Patterning-Aware Detailed Routing with Double via Insertion and via Manufacturability Consideration", IEEE Transaction on Computer-Aided Design of Integrated Circuits and Systems for Review, 2015, 1-12.

Fang, Shao-Yun "Cut Mask Optimization with Wire Planning in Self-Aligned Multiple Patterning Full-Chip Routing", IEEE 2015, pp. 396-401.

Liu et al., "Overlay-Aware Detailed Routing for Self-Aligned Double Patterning Lithography Using the Cut Process", IEEE Transactions on Coputer-Aided Design of Integrated Circuits and Systems, vol. 35, No. 9, Sep. 2016, pp. 1519-1531.

Vashishtha et al., "Design Technology Co-Optimization of Back End of Line Design Rules for a 7 nm Predictive Process Design Kit", 18th International Symposium on Quality Electronic Deisgn, 2017, pp. 149-154.

Xu et al., "Self-Aligned Double Patterning Aware Pin Access and Standard Cell Layout Co-Optimization", IEEE Transactions on Computer-Aided Design of Integrated Circuits and Systems, vol. 34, No. 5, May 2015, pp. 699-712.

* cited by examiner

SELF-ALIGNED DOUBLE PATTERNING-AWARE ROUTING IN CHIP MANUFACTURING

BACKGROUND

The present invention relates to integrated circuit (i.e., chip) manufacturing, and more specifically, to self-aligned double patterning-aware routing in chip manufacturing.

Self-aligned double patterning (SADP) is a relatively new chip manufacturing technology characterized by multiple and continuous track patterns for wires. While the wires are initially formed as continuous tracks, segments of the tracks must be removed, in accordance with the integrated circuit design and, specifically, the routing result, to create discontinuities in specified locations. A typical routed design indicates the locations of the wires. However, in view of the continuous wires associated with SADP, the router must also specify the placement of trim shapes that define the discontinuities in the wires. The trim shapes must be placed according to design rules that ensure that opens or shorts are not created. Thus, self-aligned double patterning-aware routing is needed in chip manufacturing.

SUMMARY

Embodiments of the present invention are directed to systems and methods for generating a routing result to manufacture an integrated circuit using self-aligned double patterning. The method includes generating an initial routing result that indicates a location and length of connections between components, and generating an initial constraint graph with trim shapes indicating gaps in the connections being represented as nodes and with arcs indicating relative position constraints between a pair of the nodes. The method also includes subdividing the initial constraint graph into two or more subgraphs, determining a final position of each of the nodes in the two or more subgraphs, and generating a routed design with the trim shapes having the final position of corresponding ones of the nodes relative to the connections and with extents filling in spaces between one or more of the trim shapes and associated connections. The routed design is provided for manufacture of the integrated circuit.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Integrated circuits or chips are designed and fabricated using a number of processes. The processes associated with designing the chip include obtaining a register transfer level (RTL) description and performing physical design to identify and place components such as gate logic. The physical design processes generally begin with logic synthesis, which maps the RTL description to a gate-level netlist, and end with tapeout and mask generation, which refers to turning the design data into photomasks that are used in the manufacturing process. The physical design processes also include routing, which refers to adding the wires that connect gates and other components in the netlist. As previously noted, SADP is a chip manufacturing technology in which wires are initially formed as continuous track patterns. Thus, the routing process must specify the discontinuities to be implemented in the wires using trim shapes. The placement of these trim shapes must consider design rules such as, for example, the minimum distance between adjacent trim shapes on the same track or on adjacent tracks in order to avoid design rule violations.

Embodiments of the systems and methods detailed herein relate to SADP-aware routing in chip manufacturing. The routed design includes active metal segments and dummy metal segments, which represent gaps between the active metal segments in a given track. These gaps are used to compute trims and extents, which are metal extensions between the active metal and trim shapes, according to embodiments of the invention. The trims and extents are used to cut the continuous wires during the manufacturing process. Specifically, an initial constraint graph is generated with trim shapes indicated as nodes and spacing relationships (i.e., spacing constraints) between pairs of trims indicated as arcs of different types. This initial constraint graph can include trim shapes that fail to meet design rules. In this case, the initial constraint graph is optimized iteratively. By subdividing the constraint graph into subgraphs, parallel optimization can be performed to finalize the positions of trim shapes and extents. The routed design that is generated using the optimized constraint graph can then be further optimized to generate a routed design for manufacture.

Figure 1:
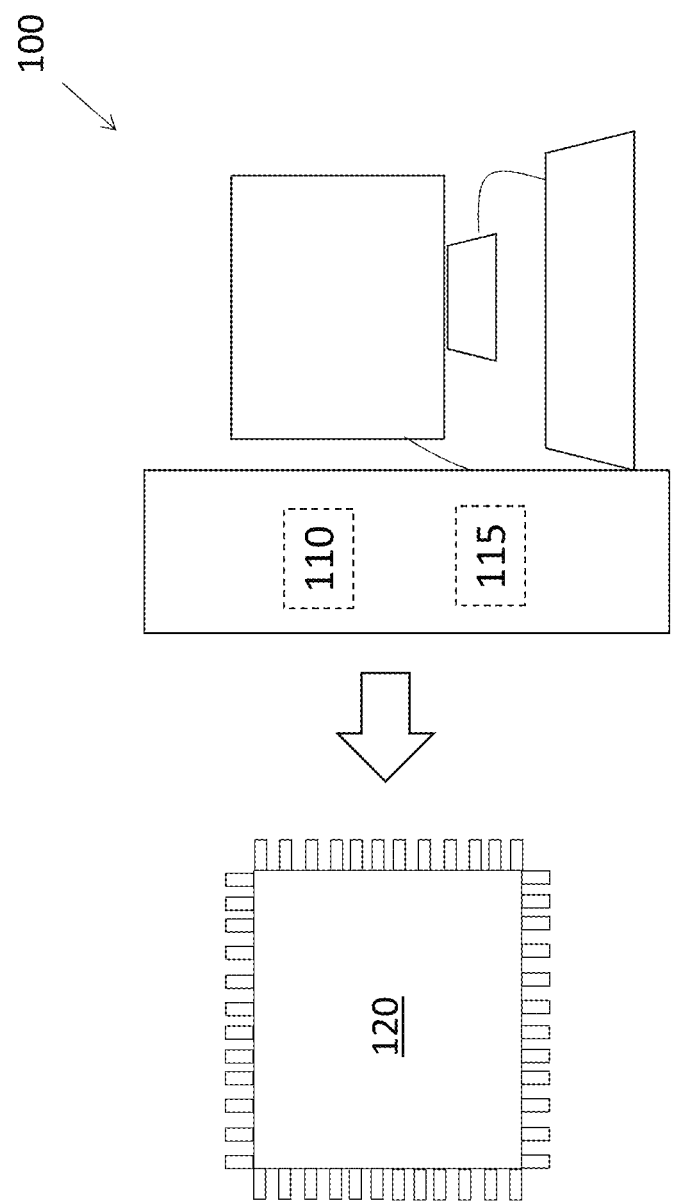
FIG. 1 is a block diagram of a system to perform self-aligned double patterning (SADP)-aware routing according to one or more embodiments of the invention.

FIG. 1 is a block diagram of a system 100 to perform SADP-aware routing according to one or more embodiments of the invention. The system 100 includes processing circuitry 110 and memory 115 that is used to generate the design that is ultimately fabricated into an integrated circuit 120. The steps involved in the fabrication of the integrated circuit 120 are well-known and only briefly described herein and with reference to FIG. 8. The physical layout is finalized, in part, based on the SADP-aware routing according to embodiments of the invention. The finalized physical layout is provided to a foundry. Masks are generated for each layer of the integrated circuit 120 based on the finalized physical layout. Then, the wafer is processed in the sequence of the mask order. The processing includes photolithography and etch. The fabrication is further discussed with reference to FIG. 8.

Figure 2:
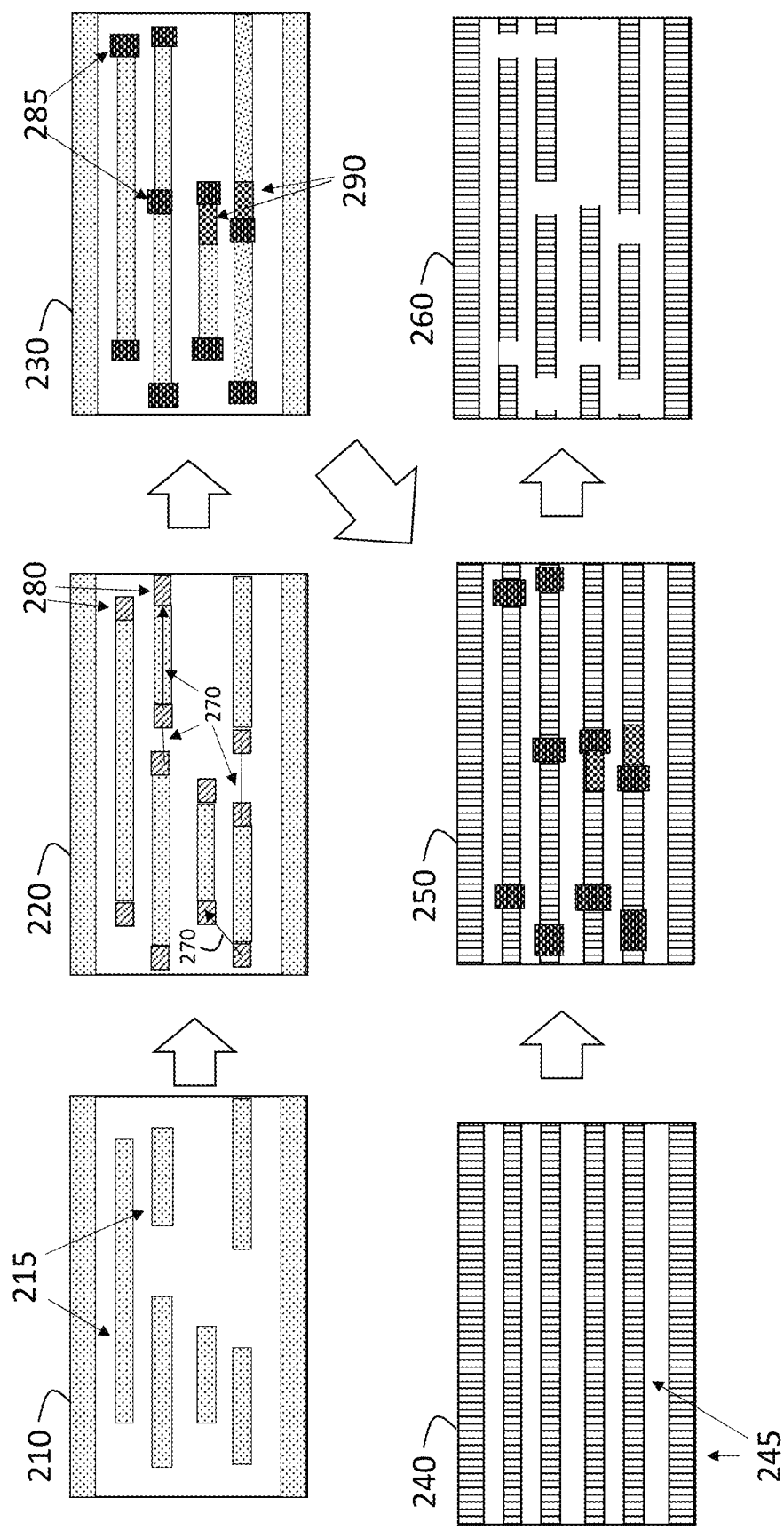
FIG. 2 illustrates a general flow of performing SADP-aware routing according to one or more embodiments of the invention.

FIG. 2 illustrates a general flow of performing SADP-aware routing according to one or more embodiments of the invention. A routing result 210 generated by the routing process is shown with the desired location and length of connections 215 between components indicated. The connections 215 represent wires 245 in the manufactured integrated circuit 120. As previously noted, this initial routing result 210 is not sufficient in a SADP manufacturing process, which requires information to create discontinuities in initially continuous wires 245.

A constraint graph 220 is also shown in FIG. 2. The constraint graph 220 includes nodes 280 that represent trim shapes 285 and arcs 270 that define spacing relationships or constraints between nodes 280. The constraint graph 220 shown in FIG. 2 is an initial graph with the nodes 280 placed at the ends of the connections 215 according to an exemplary embodiment. According to a process discussed further with reference to FIGS. 5 and 6, the positions of the nodes 280 are optimized, in accordance with the arcs 270. This process of optimizing the constraint graph 220 can be performed in parallel by breaking up the complete design, as further discussed with reference to FIG. 4. Based on the optimized constraint graph 220, trim shapes 285 are placed in the position of the nodes 280, and extents 290 are generated between the trim shapes 285 and connections 215 to generate a routed design 230. The routed design 230 can be further optimized, as needed. The further optimization can include re-routing the connections 215 and addresses design violations based on the extents 290. The final routed design 230 includes final positions of the trim shapes 285 and extents 290.

During manufacture, the initial layout 240 according to the SADP methodology is shown with continuous wires 245. The trim shapes 285 and extents 290 from the SADP-aware final routed design 230 are overlaid on the initial layout 240, as shown in the intermediary layout 250. The result is the manufactured layout 260 with the discontinuities required by the routing result 210.

Figure 3:
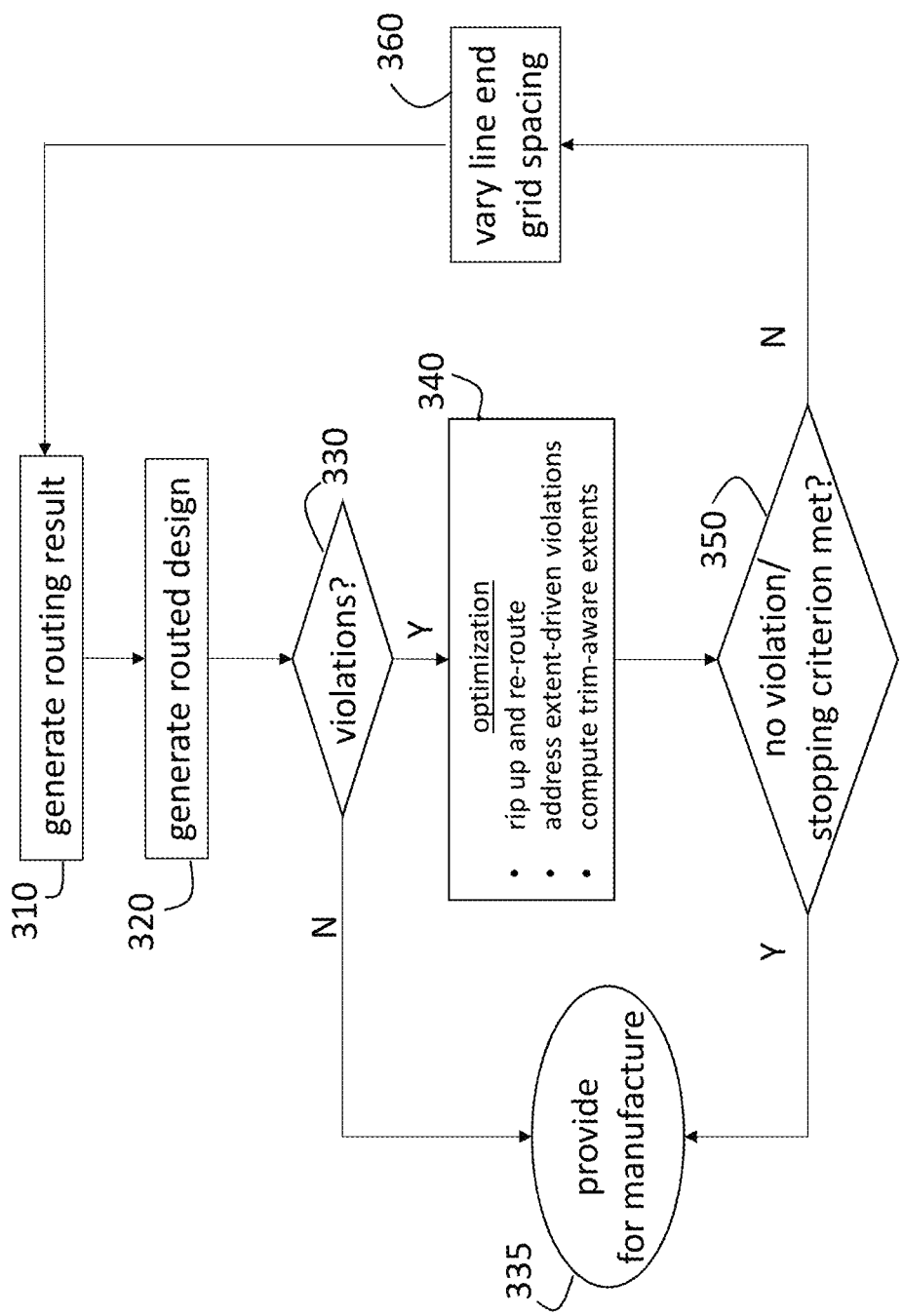
FIG. 3 is a process flow of an exemplary method of performing SADP-aware routing according to one or more embodiments of the invention.
Figure 4:
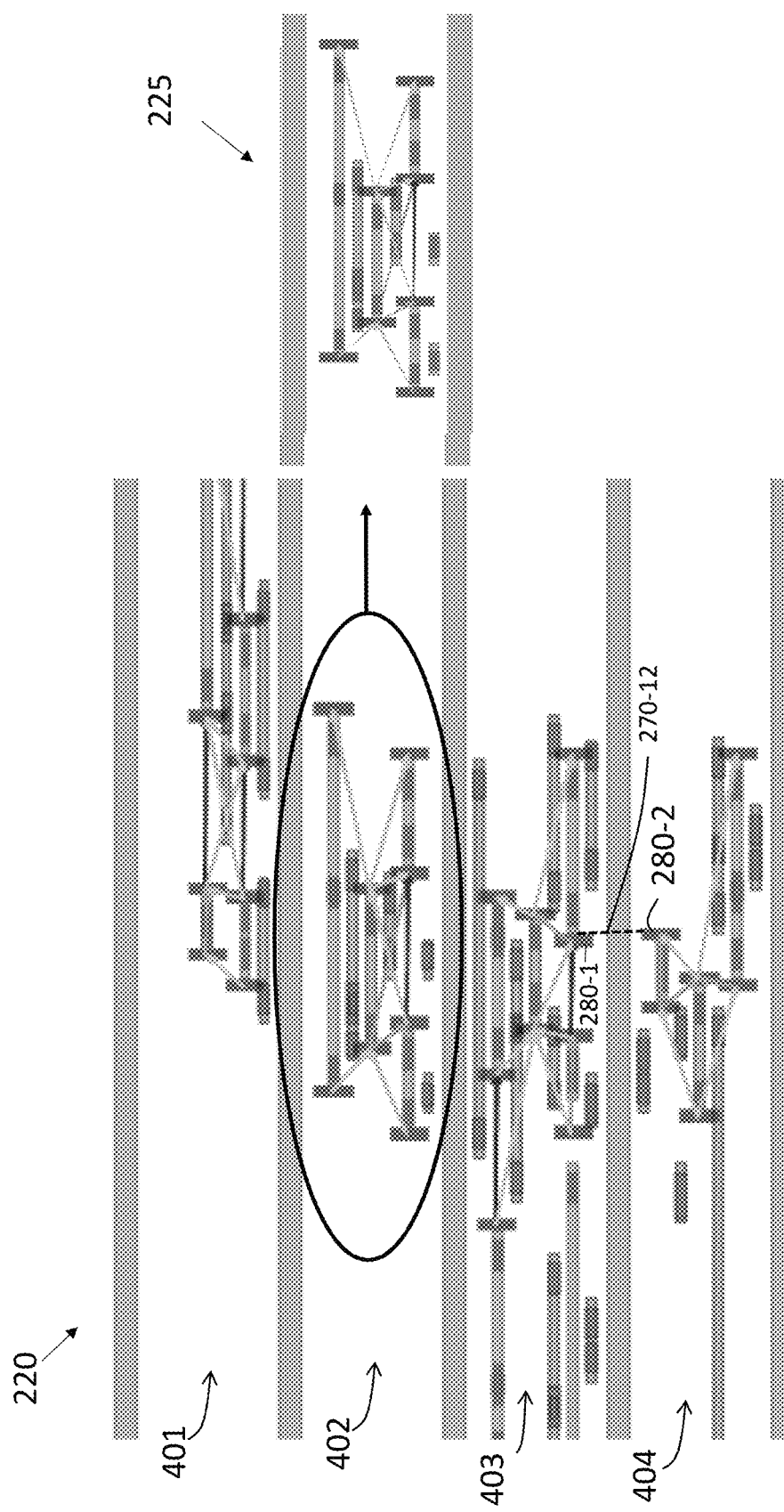
FIG. 4 illustrates subdivision of a constraint graph according to one or more embodiments of the invention.

FIG. 3 is a process flow of a method of performing SADP-aware routing according to one or more embodiments of the invention. At block 310, generating the routing result 210 refers to obtaining an indication of the location and lengths of the connections 215. Generating a routed design 230, at block 320, is based on processes detailed with reference to FIGS. 4-6. As previously noted, a constraint graph 220 is used to optimize positions of the nodes 280 that represent the trim shapes 285 based on constraints indicated by arcs 270 that connect the nodes 280. An initial constraint graph 220 can be subdivided into subgraphs 225, as shown in FIG. 4, such that each subgraph 225 is optimized in parallel. The subgraphs 225 of the constraint graph 220 can be generated by constraining the movement of some nodes 280 and pruning associated arcs 270. Once the constraint graph 220 has been optimized, as detailed with reference to FIGS. 5 and 6, the positions of the nodes 280 are used to place trim shapes 285 in the routed design 230, and extents are created between trim shapes 285 and connections 215.

At block 330, a check is done of whether any of the trim shapes 285 in the routed design 230 (generated at block 320) violate design rules. If not, the SADP-aware routed design 230, which includes the trim shapes 285 and extents 290 that facilitate trimming of the continuous wires 245 during manufacturing, is provided for manufacturing, at block 335. On the other hand, if the routed design 230 (generated at block 320) does evidence violations (according to the check at block 330), then the processes at block 340 are performed, as further discussed with reference to FIG. 7.

Generally, connections 215 are ripped up and re-routed, as needed, extent-driven design rule violations are addressed, and trim-aware extents 290 (i.e., extents 290 in consideration of the position of trim shapes 285) are placed. At block 350, a check is done of whether there are no design rule violations among trim shapes 285 or if a stopping criterion (e.g., runtime limit reached) has been met. If there are no violations or if a stopping criterion has been met, then the SADP-aware routing result 230 resulting from the processes at block 340 is provided for manufacturing, at block 335. If neither of the conditions checked at block 350 has been met, then, at block 360, line end grid spacing 510 (FIG. 5) is varied, as further discussed with reference to FIG. 5, and the processes are repeated beginning with the generation of the routing result 210, at block 310.

FIG. 4 illustrates the subdivision of a constraint graph 220 according to one or more embodiments of the invention. As FIG. 4 shows, the exemplary constraint graph 220 includes disconnected portions 401, 402, 403, 404 that result from pruning arcs 270 between inter-portion nodes 280 of the different portions 401, 402, 403, 404. This is possible based on the positions of those inter-portion nodes 280 being constrained to prevent design rule violations. For example, node 280-1 in portion 403 may have been connected by arc 270-12 to node 280-2 in portion 404 of the exemplary constraint graph 220 shown in FIG. 4. By constraining the positions of nodes 280-1 and 280-2, the arc 270-12 that constrains the positional relationship between nodes 280-1 and 280-2 can be removed. Portion 402 of the constraint graph 220 is shown as subgraph 225. Each of the portions 401, 402, 403, 404 can be treated as subgraphs 225 for purposes of optimizing the positions of the nodes 280 that are not constrained using the processes discussed with reference to FIGS. 5 and 6. Treating the constraint graph 220 as two or more subgraphs 225 facilitates parallel performance of the optimization processes and, thus, faster convergence on the final SADP-aware routing result 230.

Figure 5:
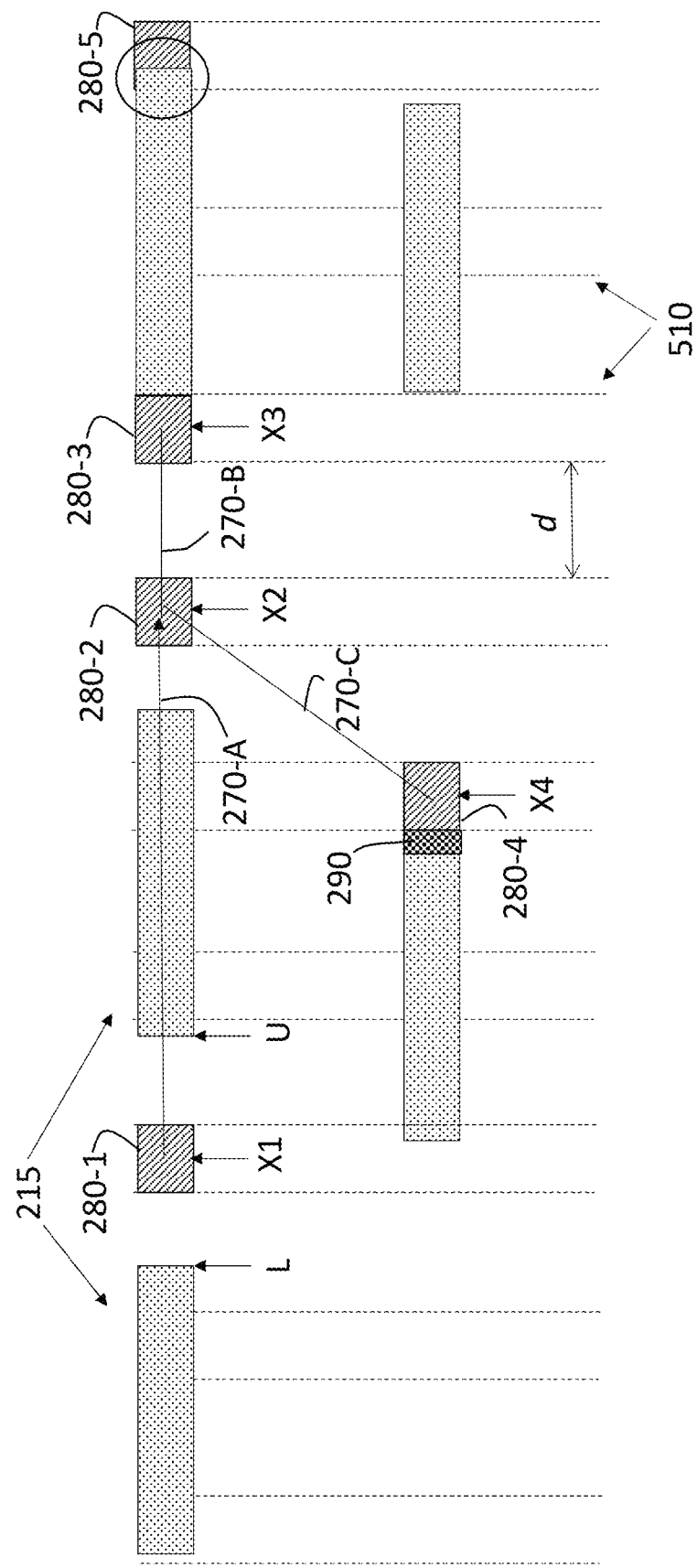
FIG. 5 illustrates aspects of the process of optimizing the constraint graph according to one or more embodiments of the invention.

FIG. 5 illustrates aspects of the process of optimizing the constraint graph 220, at block 320, according to one or more embodiments of the invention. Four nodes 280-1, 280-2, 280-3, and 280-4 are shown with their respective lateral positions X1, X2, X3, and X4 indicated. A fifth node 280-5 is shown only as an example of a violation of the design rules. The node 280-5 overlaps with the connection 215 in the circled area. In addition, three arcs 270-A, 270-B, 270-C of different types, which are discussed further, are shown. As previously noted, arcs 270 indicate a positional relationship between the nodes 280 that they connect. The different types of arcs 270 indicate different types of positional relationships, as further detailed. Nodes 280 can only be placed within the line end grids 510, which are uniformly spaced with a distance d between adjacent line end grids 510, as shown. Thus, at block 360, varying line end grid spacing refers to adjusting the distance d between line end grids 510 to be closer together or farther apart.

An axial position L and position U are indicated for the connections 215 on either side of node 280-1. Thus the feasible interval Ii for the position of node 280-1 can be indicated as {[L, U]} between L and U. As further discussed with reference to FIG. 6, once the node 280-1 is positioned at X1, the position of the node 280-2, which is connected to node 280-1 by arc 270-A, is determined in consideration of the type A of the arc 270-A. The type A refers to an arc 270 that connects two nodes 280 whose lateral position relative to each other cannot be changed. As shown in FIG. 5, node 280-1 must stay to the left of node 280-2. This is not the case for nodes 280-2 and 280-4, for example. Node 280-4 can be moved directly below node 280-3. In that case, node 280-4 would move from being to the left of node 280-2 to being to the right of node 280-2. For nodes 280-1 and 280-2 that are connected by an arc 270-A of type A, the design rules can specify a minimum distance between their lateral positions X1 and X2 that defines the feasible position of the node 280-2 once the position of node 280-1 is set.

Nodes 280-2 and 280-3 are connected by a type B arc 270-B. This means that nodes 280-2 and 280-3 can maintain their relative lateral positions, like nodes 280-1 and 280-2, with the minimum distance between them, as specified by the design rule. Additionally, nodes 280-2 and 280-3 can be merged into a single node 280 if the minimum distance between their lateral positions X2 and X3 is not feasible. Nodes 280-2 and 280-4 are connected by a type C arc 270-C. As previously noted, the relative lateral positions of nodes 280-2 and 280-4 can be switched as long as the minimum distance can be maintained between their lateral positions X2 and X4. In addition, the nodes 280-2 and 280-4 can be merged into a single node 280 if the minimum distance is not feasible.

As detailed with reference to FIG. 6, generating the optimized constraint graph 220, at block 320, entails positioning one node 280 at a time. The position selected for a given node 280 can subsequently facilitate the determination of the position of each of the nodes 280 that are connected to the given node 280 based on the type of the arc 270 that connects each of those nodes 280 to the given node 280.

Figure 6:
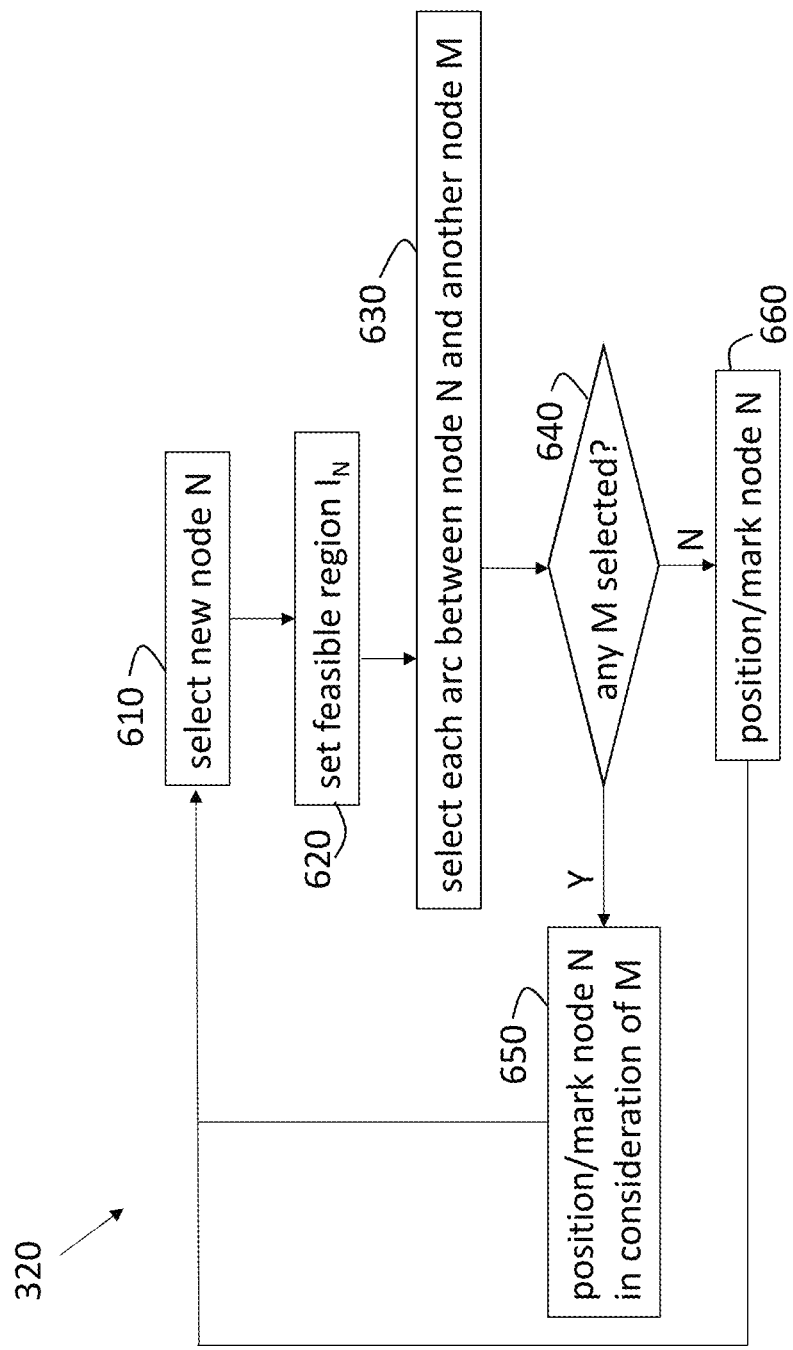
FIG. 6 is a process flow detailing the generation of the optimized constraint graph according to one or more embodiments of the invention.

FIG. 6 is a process flow detailing the generation of the optimized constraint graph 220, at block 320, according to one or more embodiments of the invention. As previously noted, an initial constraint graph 220 can include nodes 280 at the ends of each of the connections 215. That is, initially, nodes 280 can be placed without consideration of valid spacing and other design rules (e.g., at the ends of connections 215). The spacing constraints between nodes 280 are indicated by arcs 270. The optimized constraint graph 220 can then be developed as detailed in FIG. 6. At block 610, selecting a new node 280 N indicates that each node 280 is only selected once according to the flow shown in FIG. 6, and the process of optimizing the constraint graph 220 (as part of block 320) ends when all the nodes 280 have been considered once. At block 620, setting the feasible regions IN for the selected node 280 N involves considering the feasible interval between connections 215 as discussed with reference to FIG. 5, for example.

At block 630, the processes include selecting, one-at-a-time, each arc 270 between node 280 N and another node 280 M. A determination is made, at block 640, of whether the other node 280 M was selected (at block 610) already. If so, at block 650, the position that is selected for node 280 N is affected by the arc 270 between node 280 N and node 280 M and the previously selected position of node 280 M. In this regard, the type of the arc 270 determines, for example, whether the node 280 N and M can be merged or their relative lateral positions can be switched. That is, if the arc 270 between nodes 280 N and M is type A, then the feasible region IN for placement of node 280 N is the intersection of the feasible interval (between connections 215 that are adjacent to the node 280 N) and the region at and beyond the minimum distance permitted by the design rules. If the arc 270 between nodes 280 N and M is type B, then, the feasible region IN includes the feasible region IN discussed with reference to a type A arc 270 and, additionally, a region in which the nodes 280 N and M can be merged. If the arc 270 between nodes 280 N and M is type C, then the feasible region IN is the feasible region IN discussed for the arc 270 of type B and, additionally, a region that meets the minimum distance requirement but on the opposite lateral side of node 280 M.

If a non-empty feasible region IN is identified based on the arcs 270 associated with node 280 N (at block 650), then the node 280 N is positioned, between line end grids 510, if possible, within the feasible region IN, and is marked as feasible, in addition to being marked as selected. If the feasible region IN that meets the design rules, in accordance with the type of the arc 270, is empty (at block 650), then node 280 N is positioned at its ideal position (e.g., at its initial position at the edge of a connection 215) and marked as infeasible, in addition to being marked as selected. If, based on the check at block 640, it is determined that none of the nodes 280 connected by arcs 270 to node 280 N have been selected (e.g., node 280 N is the first node selected among the nodes 280 to which it is connected), then node 280 N is positioned within its feasible interval and marked as selected, at block 660.

Figure 7:
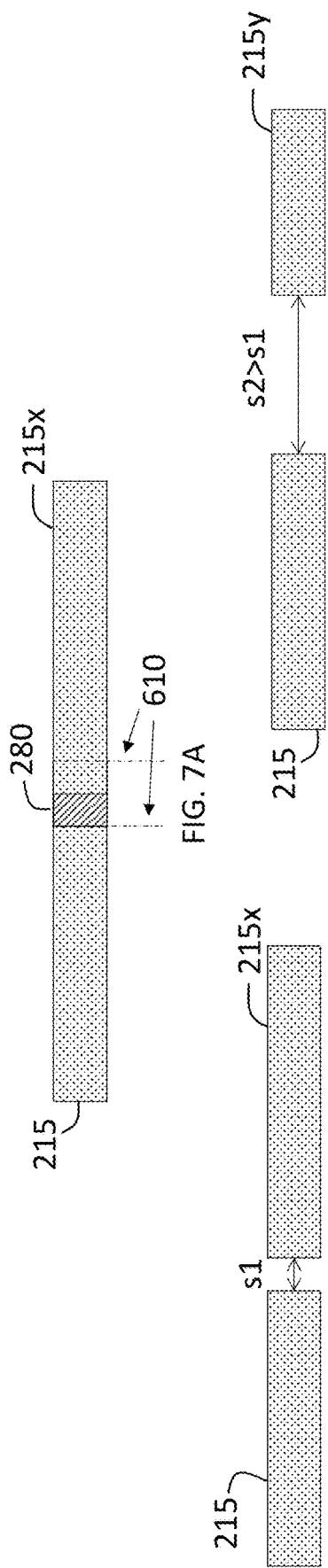
FIG. 7 illustrates aspects of optimization processes according to embodiments of the invention.

FIG. 7 illustrates aspects of optimization processes, at block 340, according to embodiments of the invention. In FIG. 7A, the dashed lines 710 indicate the width of the trim shape 285 and show the overlap between the trim shape 285 and connection 215x. As shown in FIG. 7B, the trim shape 285 is removed. The gap between connection 215x and the adjacent connection 215 has a length of s1. Then, as shown in FIG. 7C, the connection 215x is ripped up and replaced with connection 215y, which is less wide than connection 215x. As a result, the length of the gap between connection 215y and the adjacent connection 215, which represents the feasible interval for a trim shape 285, is increased from s1 to s2. Not only is s2 greater than s1 but is also greater than the width of a trim shape 285. In FIG. 7D, a trim shape 285 is inserted, followed by insertion of an extent 290, as shown in FIG. 7E.

Figure 8:
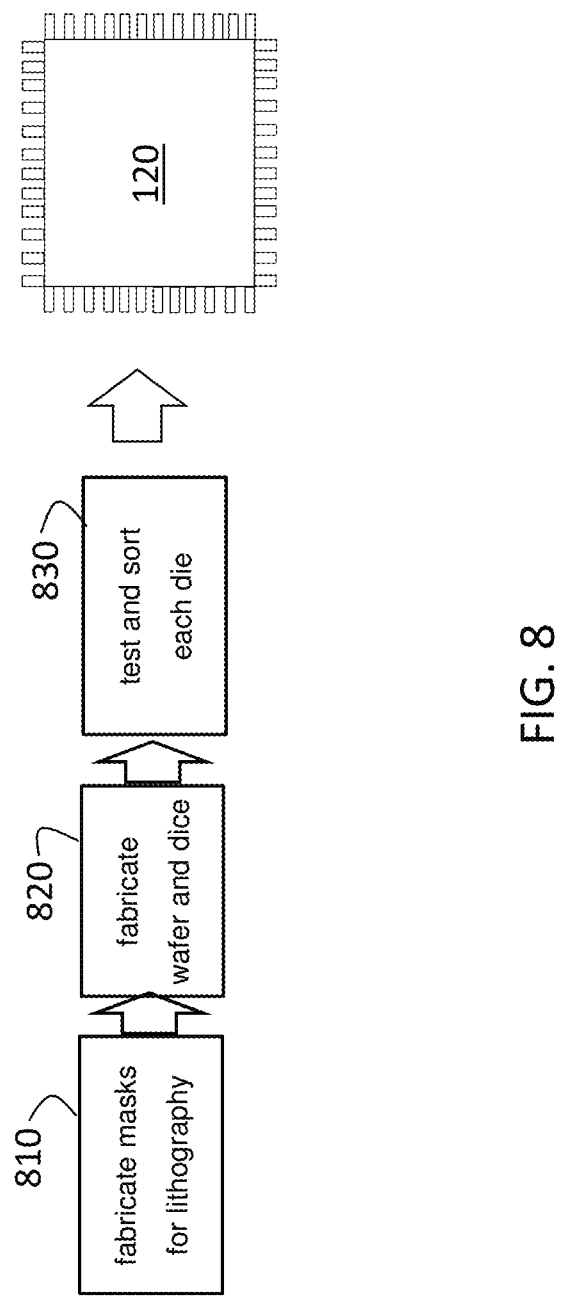
FIG. 8 is a process flow of a method of fabricating the integrated circuit designed according to one or more embodiments of the invention.

FIG. 8 is a process flow of a method of fabricating the integrated circuit 120 designed according to one or more embodiments of the invention. Once the physical design data is obtained, based, in part, on performing self-aligned double patterning-aware routing according to one or more embodiments of the invention, the processes shown in FIG. 8 can be performed to fabricate the integrated circuit 120. Generally, a wafer with multiple copies of the final design is fabricated and cut (i.e., diced) such that each die is one copy of the integrated circuit 120. At block 810, the processes include fabricating masks for lithography based on the finalized physical layout. At block 820, fabricating the wafer includes using the masks to perform photolithography and etching. Once the wafer is diced, testing and sorting each die is performed, at block 830, to filter out any faulty die.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of generating a routing result to manufacture an integrated circuit using self-aligned double patterning, the method comprising:
generating, using a processor, an initial routing result that indicates a location and length of connections between components;
generating, using the processor, an initial constraint graph with trim shapes indicating gaps in the connections being represented as nodes and with arcs indicating relative position constraints between a pair of the nodes;
subdividing, using the processor, the initial constraint graph into two or more subgraphs;
determining, using the processor, a final position of each of the nodes in the two or more subgraphs;
generating, using the processor, a routed design with the trim shapes having the final position of corresponding ones of the nodes relative to the connections and with extents filling in spaces between one or more of the trim shapes and associated connections; and
providing the routed design for manufacture of the integrated circuit, wherein the subdividing the initial constraint graph is based on constraining movement of two or more of the nodes and pruning one or more arcs between the two or more of the nodes.

2. The computer-implemented method according to claim 1, wherein the determining the final position of each of the nodes is based on an iterative process of positioning one of the nodes per iteration.

3. The computer-implemented method according to claim 2, wherein the positioning one of the nodes is based on a type of the arc between the one of the nodes and a previously positioned one of the nodes.

4. The computer-implemented method according to claim 3, wherein the positioning the one of the nodes includes maintaining a relative lateral position of the one of the nodes with respect to the previously positioned one of the nodes, changing the relative lateral position of the one of the nodes with respect to the previously positioned one of the nodes, or merging the one of the nodes with the previously positioned one of the nodes based on the type of the arc.

5. The computer-implemented method according to claim 1, further comprising improving the routed design prior to providing the routed design for manufacture.

6. The computer-implemented method according to claim 5, wherein the improving the routed design includes removing and re-routing connections or extents.

7. A system to generate a routing result to manufacture an integrated circuit using self-aligned double patterning, the system comprising:
a memory device configured to store an integrated circuit design; and
a processor configured to generate an initial routing result that indicates a location and length of connections between components of the integrated circuit design, to generate an initial constraint graph with trim shapes indicating gaps in the connections being represented as nodes and with arcs indicating relative position constraints between a pair of the nodes, to subdivide the initial constraint graph into two or more subgraphs, to determine a final position of each of the nodes in the two or more subgraphs, to generate a routed design with the trim shapes having the final position of corresponding ones of the nodes relative to the connections and with extents filling in spaces between one or more of the trim shapes and associated connections, and to provide the routed design for manufacture of the integrated circuit, wherein the processor is configured to subdivide the initial constraint graph based on constraining movement of two or more of the nodes and pruning one or more arcs between the two or more of the nodes.

8. The system according to claim 7, wherein the processor is configured to determine the final position of each of the nodes based on an iterative process of positioning one of the nodes per iteration.

9. The system according to claim 8, wherein the processor is configured to position one of the nodes during an iteration based on a type of the arc between the one of the nodes and a previously positioned one of the nodes.

10. The system according to claim 9, wherein the processor is configured to position the one of the nodes during the iteration by maintaining a relative lateral position of the one of the nodes with respect to the previously positioned one of the nodes, changing the relative lateral position of the one of the nodes with respect to the previously positioned one of the nodes, or merging the one of the nodes with the previously positioned one of the nodes based on the type of the arc.

11. The system according to claim 7, wherein the processor is further configured to improve the routed design prior to providing the routed design for manufacture.

12. The system according to claim 7, wherein the processor is configured to improve the routed design based on removing and re-routing connections or extents.

13. A computer program product for generating a routing result to manufacture an integrated circuit using self-aligned double patterning, the computer program product comprising a computer readable storage medium having program instructions embodied therewith, the program instructions executable by a processor to perform a method comprising:

generating an initial routing result that indicates a location and length of connections between components;

generating an initial constraint graph with trim shapes indicating gaps in the connections being represented as nodes and with arcs indicating relative position constraints between a pair of the nodes;

subdividing the initial constraint graph into two or more subgraphs;

determining a final position of each of the nodes in the two or more subgraphs; and generating a routed design with the trim shapes having the final position of corresponding ones of the nodes relative to the connections and with extents filling in spaces between one or more of the trim shapes and associated connections, wherein the routed design is provided for manufacture of the integrated circuit, wherein the subdividing the initial constraint graph is based on constraining movement of two or more of the nodes and pruning one or more arcs between the two or more of the nodes.

14. The computer program product according to claim 13, wherein the determining the final position of each of the nodes is based on an iterative process of positioning one of the nodes per iteration.

15. The computer program product according to claim 14, wherein the positioning one of the nodes is based on a type of the arc between the one of the nodes and a previously positioned one of the nodes.

16. The computer program product according to claim 15, wherein the positioning the one of the nodes includes maintaining a relative lateral position of the one of the nodes with respect to the previously positioned one of the nodes, changing the relative lateral position of the one of the nodes with respect to the previously positioned one of the nodes, or merging the one of the nodes with the previously positioned one of the nodes based on the type of the arc.

17. The computer program product according to claim 13, further comprising improving the routed design prior to providing the routed design for manufacture, wherein the improving the routed design includes removing and re-routing connections or extents.

\* \* \* \* \*